United States Patent
Saeueng et al.

(10) Patent No.: US 7,501,715 B2
(45) Date of Patent: Mar. 10, 2009

(54) MULTI-OUTPUT DC-DC CONVERTER

(75) Inventors: Sakda Saeueng, Samutprakarn (TH); Mingchun Xu, Samutprakarn (TH); Weng Leong Hon, Samutprakarn (TH)

(73) Assignees: Delta Electronics, Inc., Taoyuan Hsien (TW); Delta Electronics (Thailand) Public Company, Limited, Samutprakarn (TH)

( * ) Notice: Subject to any disclaimer, the term of this patent is extended or adjusted under 35 U.S.C. 154(b) by 147 days.

(21) Appl. No.: 11/142,025

(22) Filed: Jun. 1, 2005

(65) Prior Publication Data

US 2006/0274559 A1    Dec. 7, 2006

(51) Int. Cl.
*H02J 1/00* (2006.01)
(52) U.S. Cl. ........................................ 307/34
(58) Field of Classification Search .............. 363/21.06, 363/21.14, 81, 84, 89, 127; 307/34
See application file for complete search history.

(56) References Cited

U.S. PATENT DOCUMENTS

| | | | | |
|---|---|---|---|---|
| 4,323,962 A | * | 4/1982 | Steigerwald ................. | 307/34 |
| 5,303,138 A | * | 4/1994 | Rozman ................... | 363/21.06 |
| 5,663,874 A | * | 9/1997 | Mader et al. ............. | 363/21.14 |
| 6,449,175 B1 | * | 9/2002 | Cuadra et al. ................. | 363/89 |
| 6,714,426 B1 | * | 3/2004 | Guo et al. ..................... | 363/25 |
| 6,788,554 B2 | * | 9/2004 | Havanur .................. | 363/21.06 |
| 6,807,071 B1 | * | 10/2004 | Zhang et al. ................... | 363/20 |
| 6,980,441 B2 | * | 12/2005 | Man-ho ................... | 363/21.06 |
| 6,987,679 B2 | * | 1/2006 | Gan et al. ..................... | 363/89 |
| 7,038,922 B2 | * | 5/2006 | Diallo et al. ............. | 363/21.06 |
| 2006/0113974 A1 | * | 6/2006 | Kan et al. .................... | 323/282 |

* cited by examiner

*Primary Examiner*—Shawn Riley (57) ABSTRACT

A multi-output DC-DC converter is advantageous over the conventional multi-output DC-DC converter in terms of increased power efficiency and power density. The inventive multi-output DC-DC converter is characterized by that the rectifying circuit located at the output stage of the DC-DC converter is implemented by a pair of self-driven synchronous rectifier transistors that can prevent a reverse current from flowing through the switch elements of the DC-DC converter. Also, a plurality of post voltage regulators are tapped to a secondary winding of the DC-DC converter, in which each post voltage regulator includes a voltage level shifter circuit for allowing gate drivers to impose a small amount of dead time on the control pulse signals for driving the internal transistor switches to minimize the dead time loss occurred during power conversion operation.

7 Claims, 6 Drawing Sheets

MULTI-OUTPUT DC-DC CONVERTER

FIELD OF THE INVENTION

The present invention is related to a synchronous rectification multi-output DC-DC converter, and more particularly to a synchronous rectification multi-output DC-DC converter with increased power efficiency and power density.

BACKGROUND OF THE INVENTION

Figure 1:
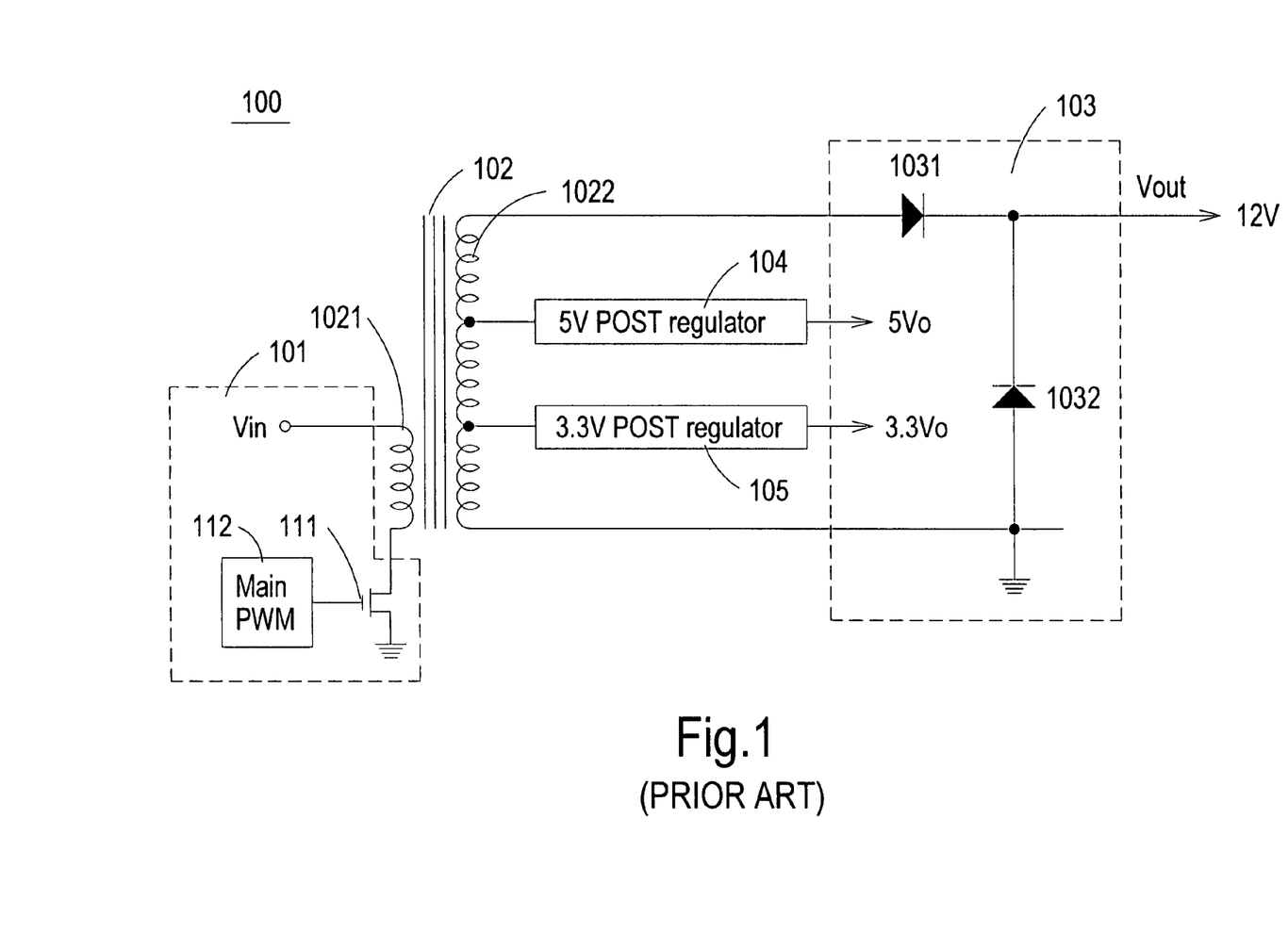
FIG. 1 shows a typical circuit configuration of a conventional multi-output DC-DC converter 100 having a secondary side post regulation.

FIG. 1 shows a typical circuit configuration of a conventional multi-output DC-DC converter 100 having a secondary side post regulation. The switching DC-DC converter 100 includes a power inverter 101, a power transformer 102, an output circuit 103 and a plurality of post voltage regulators 104 and 105. The power inverter 101 includes a switch circuit 111, which is typically implemented by a MOSFET switch for transferring energy received from an input DC voltage Vin to the power transformer 102 according to its on/off operations. The power inverter 101 further includes a main pulse width modulator (PWM) 112 for controlling the on/off operations of the switch circuit 111. The power transformer 102 includes a primary winding 1021 coupled to the switch circuit 111 and a secondary winding 1022 coupled to the output circuit 103 for providing an electric isolation between the input terminal and the output terminal of the DC-DC converter, wherein the power transformer 102 is configured to receive an input DC voltage Vin from the primary winding 1021 and transfer energy across the secondary winding 1022 according to the open and close of the switch circuit 111. The output circuit 103 which is made up of rectifying diodes 1031 and 1032 is coupled to the secondary winding 1022 for receiving energy from the secondary winding 1022 and providing a predetermined output voltage Vout, for example, 12 volts, to a load (not shown). Also, each individual post voltage regulator 104,105 is tapped to the secondary winding 1022 for providing a lower regulated DC voltage, for example, 5 volts or 3.3 volts.

Figure 2A:
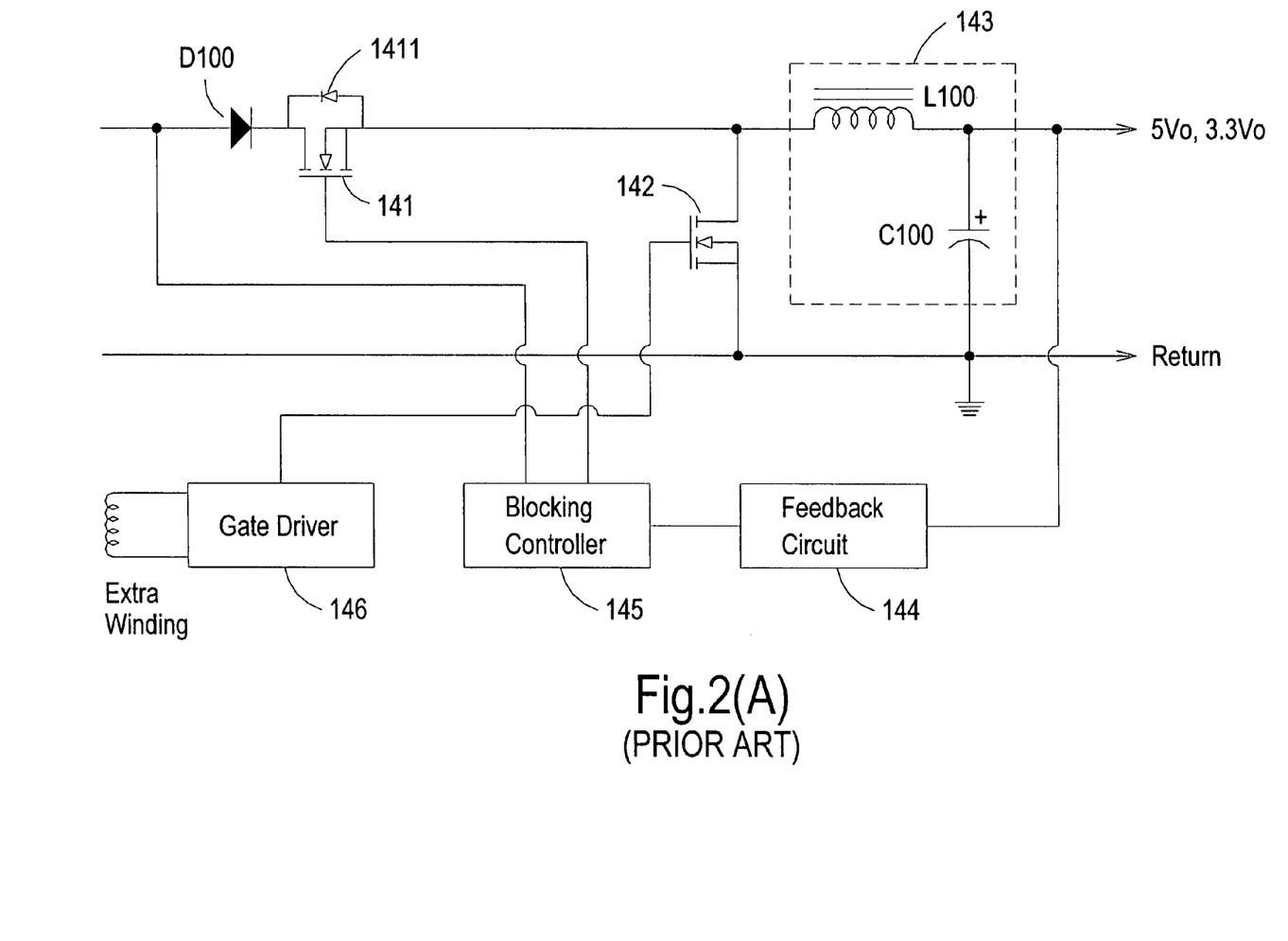
FIG. 2(A) shows a typical circuit representation of a post voltage regulator of FIG. 1.

FIG. 2(A) shows a typical circuit representation of a post voltage regulator of FIG. 1. The post voltage regulator of FIG. 2(A) includes a current blocking circuit 141, a synchronous rectifier 142, an output filter 143, a feedback circuit 144, a blocking controller 145, and a gate driver 146. The current blocking circuit 141, which is implemented by a MOS transistor, is coupled to the secondary winding 1022 of the power transformer 102 shown in FIG. 1 for blocking the transfer of current (and energy) from the secondary winding 1022 to the output stage of the post voltage regulator via its inherent body diode 1411 during the blocking time interval. The synchronous rectifier 142 which is implemented by a transistor switch is coupled to the current blocking circuit 141 for rectifying a square wave AC voltage induced on the secondary winding 1022 of the power transformer 102 into a rectified DC voltage. The output filter 143 is made up of by a choke coil L100 and a smoothing capacitor C100 for smoothing the rectified DC voltage of the post voltage regulator so as to provide a constant DC voltage at its output terminal. The feedback circuit 144 is coupled to the output terminal of the output filter 143 for calculating a difference between a fractional output voltage of the post voltage regulator and a reference voltage and generating a feedback amount dependent on the output voltage of the post voltage regulator accordingly. The blocking controller 145 is coupled to the gate terminal of the current blocking circuit 141 for controlling the blocking time interval of the current blocking circuit 141 according to the feedback amount, thereby making fine adjustments to the output voltage of the post voltage regulator. The gate driver 146 is coupled to the gate terminal of the synchronous rectifier 142 for driving the synchronous rectifier 142 to achieve synchronous rectification. Further, the post voltage regulator includes a reverse current protection diode D100 for preventing a reverse current from flowing through the current blocking circuit 141.

Figure 2B:
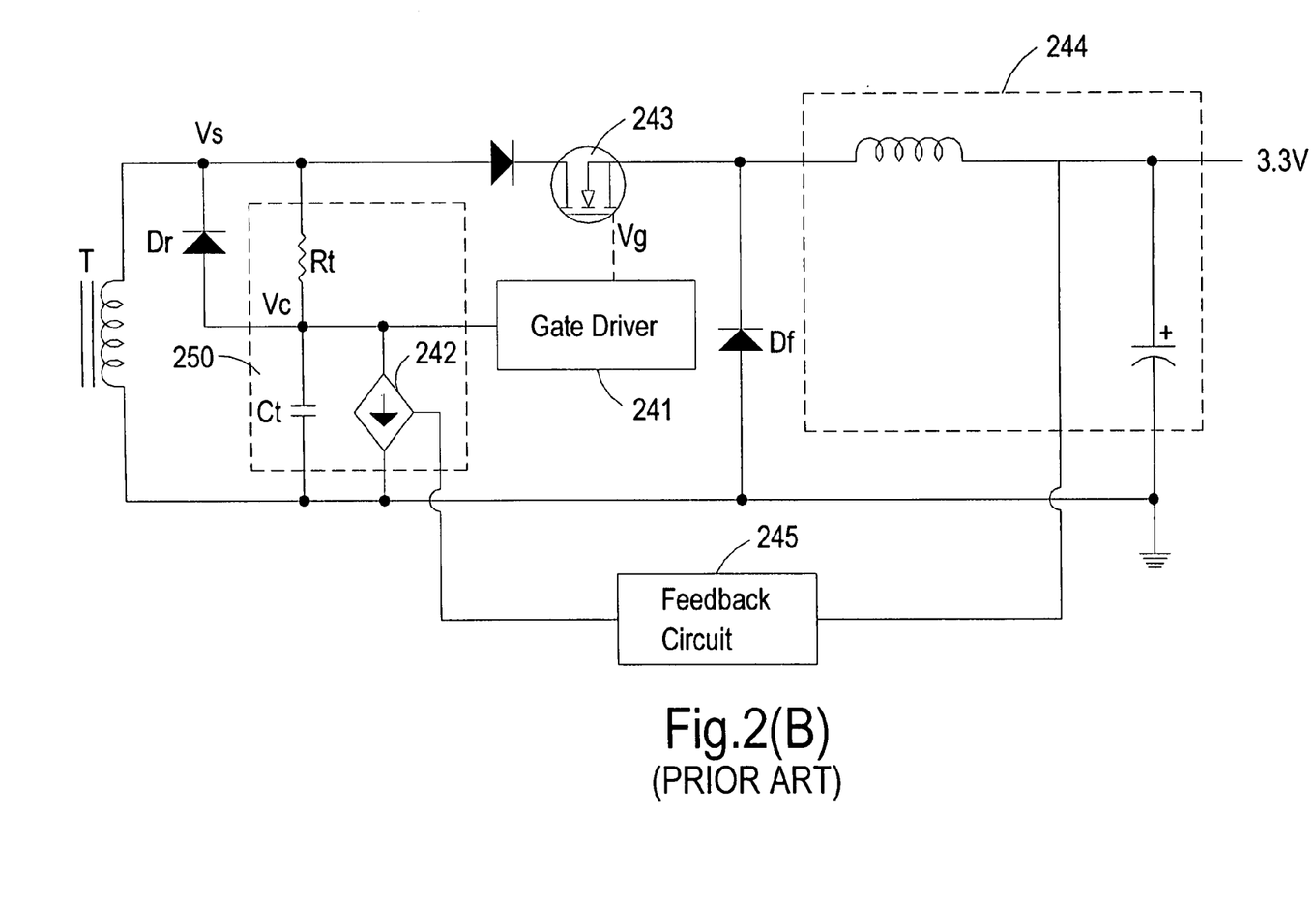
FIG. 2(B) shows another typical circuit representation of a post voltage regulator of FIG. 1.

FIG. 2(B) shows another typical circuit representation of a post voltage regulator of FIG. 1. The post voltage regulator of FIG. 2(B) includes a gate driver 241, a RC network (Rt,Ct), a voltage-controlled current source 242, a synchronous rectifier switch 243, an output filter 244, and a feedback circuit 245. The composition and principle of the output filter 244 and the feedback circuit 245 are similar to the composition and the principle of their counterparts of FIG. 2(A), and their explanations are omitted herein for simplicity. In FIG. 2(B), the gate driver 241 provides a series of control pulse signals to turn the synchronous rectifier switch 243 on and off in a controlled duty cycle, so that the magnitude of the output voltage of the post voltage regulator can be adjusted for the compensation for the variation of the output voltage. The voltage-controlled current source 242 and the RC network (Rt,Ct) form a ramp signal generator 250, in which the capacitor Ct is charged with an imposed time constant for producing a time-varying ramp voltage. The voltage-controlled current source 242 is used to fine tune the charging rate of the capacitor Ct. The time-varying ramp voltage is provided to the gate driver 241 for calculation with a feedback signal derived from an error amplifier. (not shown) of the feedback circuit 245 in order to generate control pulse signals for controlling the switching duty cycle of the synchronous rectifier switch 243. The diode Dr is configured to make sure that when the ramp signal generator 250 is activated, the voltage across the capacitor Ct can be discharged quickly. In addition, the diode Df functions as a freewheeling diode and is coupled to the choke coil of the output filter 244 for providing a current condition path for the release of the energy stored in the choke coil when the load voltage decays to zero.

However, the prior art multi-output DC-DC converter discussed hereinbefore suffers several disadvantages needing to be immediately addressed. First, when isolation is employed in a DC-DC converter, the input voltage is typically switched on and off at a high frequency, and provided to a power transformer, which provides the input/output isolation and the suitable voltage conversion. However, because the input voltage is switched at the high frequency, the output voltage and current typically cannot be directly provided to a load in a regulated manner. Thus, an inductor is generally required in the energy conversion to act as a current filter. The size and value of the inductor are often critical to meeting the performance specifications. A large inductance volume normally reduces the power density of the converter. Further, because inductors with large inductance values have low slew rates, the response time of the converter to load current disturbances is slowed down. Accordingly, smaller inductance volumes and values are desirable.

Secondly, isolated DC-DC converters typically operate with at least some amount of dead time. Dead time indicates the time lag for preventing two switch elements to turn on at the same time. During dead time operation, a rectification current is set to flow through the body diodes of the switch elements. Hence, dead time loss (that is, the body diode conduction loss) would yield a great power loss and deteriorate the overall power efficiency for the DC-DC converter.

It is therefore inclined to develop a multi-output DC-DC converter with an increased power efficiency and improved power density.

SUMMARY OF THE INVENTION

An object of the present invention is to provide a multi-output DC-DC converter using synchronous rectification with less power loss and better power density.

According to the principal aspect of the present invention, a multi-output DC-DC converter is provided and includes a power inverter having a main pulse width modulator and a switch circuit for transferring energy received from an input DC voltage, a power transformer having a primary winding and a secondary winding, wherein the primary winding is coupled to the power inverter for receiving the energy therefrom and transferring the energy across the secondary winding according to the open and close of the switch circuit, a rectifier transistor circuit coupled to the secondary winding for rectifying the energy transferred from the secondary winding into a rectified DC voltage, an output filter coupled to the rectifier transistor circuit for smoothing the rectified DC voltage to generate a regulated DC voltage, and a plurality of post voltage regulators tapped to the secondary winding for providing a plurality of regulated DC voltages.

According to a first embodiment of the present invention, the post voltage regulator is made up of a current blocking device coupled to the secondary winding for blocking the transfer of a current from the secondary winding, a synchronous rectifier coupled to the current blocking device for rectifying an AC voltage induced across the secondary winding into a rectified DC voltage, an output filter coupled to the current blocking device and the synchronous rectifier for smoothing the rectified DC voltage and generating a regulated DC voltage, a feedback circuit coupled to an output end of the output filter for comparing the regulated DC voltage with a reference voltage and generating a feedback signal accordingly, and a blocking controller coupled to the feedback circuit and the main pulse width modulator for generating control pulse signals in accordance with the feedback signal to drive the current blocking device and the synchronous rectifier.

According to a second embodiment of the present invention, the post voltage regulator is made up of a first transistor switch for rectifying an AC voltage induced across the secondary winding, a second transistor switch for blocking the transfer of a current from the secondary winding, a ramp signal generator coupled to the secondary winding for generating a raw ramp voltage, a first gate driver coupled between the ramp signal generator and the first transistor switch for receiving the raw ramp voltage and generating control pulse signals in accordance with the raw ramp voltage to drive the first transistor switch, a voltage level shifter circuit coupled to the ramp signal generator for subtracting a voltage level from the raw ramp voltage to generate a phase-shifted ramp voltage, and a second gate driver coupled between the voltage level shifter circuit and the second transistor switch for receiving the phase-shifted ramp voltage and generating control pulse signals in accordance with the phase-shifted ramp voltage to drive the second transistor switch.

The foregoing and other features and advantages of the present invention will be best understood through the following descriptions with reference to the accompanying drawings, wherein:

DETAILED DESCRIPTION OF THE PREFERRED EMBODIMENT

The disclosed switching DC-DC converters in the following embodiments are aimed at providing an increased power efficiency by reducing the amount of dead time occurring during power conversion operation and an improved power density by reducing the number of inductive elements in the circuit.

Figure 3:
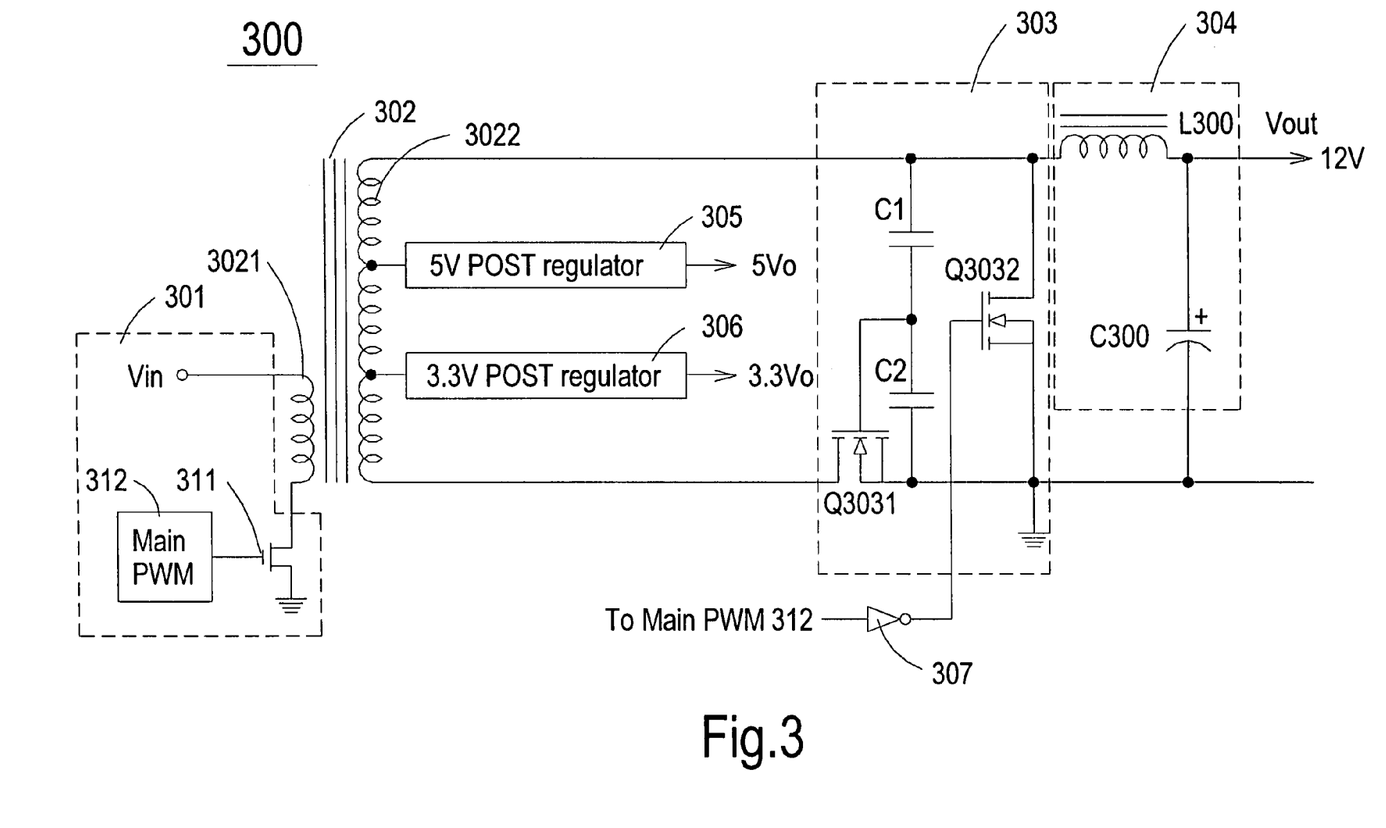
FIG. 3 shows a typical circuit configuration of a multi-output DC-DC converter having a secondary side post regulation according to the present invention.

Referring to FIG. 3, a typical representation of a multi-output DC-DC converter 300 having a secondary side post regulation according to the present invention is illustrated. In FIG. 3, the switching DC-DC converter 300 includes a power inverter 301, a power transformer 302, a synchronous rectifier circuit 303, an output circuit 304, and a plurality of post voltage regulators 305 and 306. The power inverter 301 includes a switch circuit 311, typically implemented by a MOSFET switch, that transfers energy to the power transformer 302 according to its on/off operations. The power inverter 301 further includes a main pulse width modulator (PWM) 312 for controlling the on/off operations of the switch circuit 311. The power transformer 302 includes a primary winding 3021 coupled to the switch circuit 311 and a secondary winding 3022 coupled to the synchronous rectifier circuit 303 and the output circuit 304 for providing an electric isolation between the input terminal and the output terminal of the converter 300, wherein the power transformer 302 is configured to receive an input DC voltage Vin from the primary winding 3021 and transfer energy across the secondary winding 3022 according to the open and close of the switch circuit 311.

The synchronous rectifier circuit 303 is coupled to the secondary winding 3022 for rectifying the energy received from the secondary winding 3022 and providing a rectified DC voltage. The output circuit 304 is made up of a choke coil L300 and a smoothing capacitor C300, and is coupled to the synchronous rectifier 303 for smoothing the rectified DC voltage provided by the synchronous rectifier circuit 303 and providing a regulated DC voltage, for example, 12 volts, to a load (not shown). Also, each individual post voltage regulator 305,306 is tapped to the secondary winding 3022 for providing a lower regulated DC voltages, for example, 5 volts or 3.3 volts.

Referring to FIG. 1 and FIG. 2(A), the reverse current protection diode D100 shown in FIG. 2(A) is connected between the secondary winding 1022 and the current blocking circuit 141 for preventing a reverse current from flowing through the current blocking circuit 141. However, the diode D100 would cause a considerable power loss during power conversion operation. As a result, it is desirable to remove the diode D100 and replace it with a current conducting element having less power consumption characteristic. To this end, the rectifying diode 1031 can be relocated so that the cathode of the rectifying diode 1031 is connected to the lower end of the secondary winding 1022 and the anode of the rectifying diode 1031 is connected to the ground terminal. Under this condition, the reverse current flowing from the output terminal to the secondary winding 1022 can be prohibited. Moreover, in order to further abate the power loss occurred in the circuit, the rectifying diodes 1031 and 1032 are replaced with rectifier transistors Q3031 and Q3032, as shown in FIG. 3. In FIG. 3, a pair of series capacitors C1 and C2 are coupled across the secondary winding and the rectifier transistor Q3031. The gate terminal of the rectifier transistor Q3031 is coupled to a center terminal of the pair of series capacitors C1 and C2. The series capacitor pair C1 and C2 functions as gate driver for providing control pulse signals to drive the rectifier transistor Q3031. Also, the gate terminal of the rectifier transistor Q3032 is connected to the main PWM 312 via an inverter 307, and is driven by the inverse version of the PWM signals of the main PWM 312.

Figure 4A:
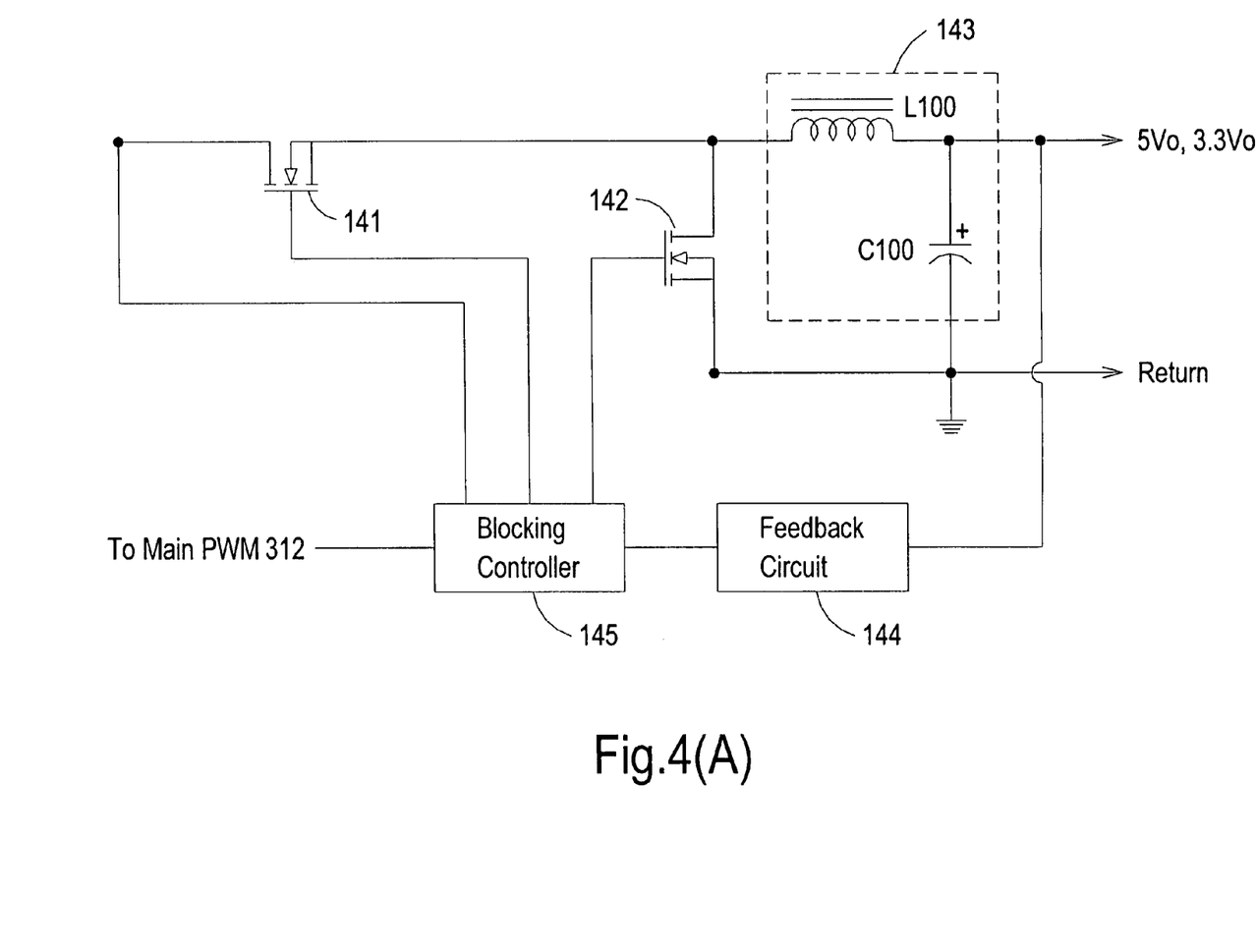
FIG. 4(A) shows a typical circuit representation of a post voltage regulator according to a first embodiment of the present invention.

FIG. 4(A) shows a typical circuit representation of a post voltage regulator according to a first embodiment of the present invention. Similar circuit components depicted in the circuit diagrams of FIG. 2(A) and FIG. 4(A) are represented with the same reference numerals, and the explanation for their function and principle are omitted herein for simplicity. Compared to the circuit of FIG. 2(A), the reverse current protection diode D100 of FIG. 2(A) is removed from the post voltage regulator as shown in FIG. 4(A), and thus the overall power efficiency of the post voltage regulator of FIG. 4(A) is upgraded accordingly. Also, it is to be noted that the blocking controller 145 is coupled to the main PWM circuit 312 of the power inverter 301, so that the main PWM circuit 312 can supply pulse signals to the blocking controller 145 to produce control pulse signals for regulating the duty cycle of the MOSFET switches 141 and 142.

Figure 4B:
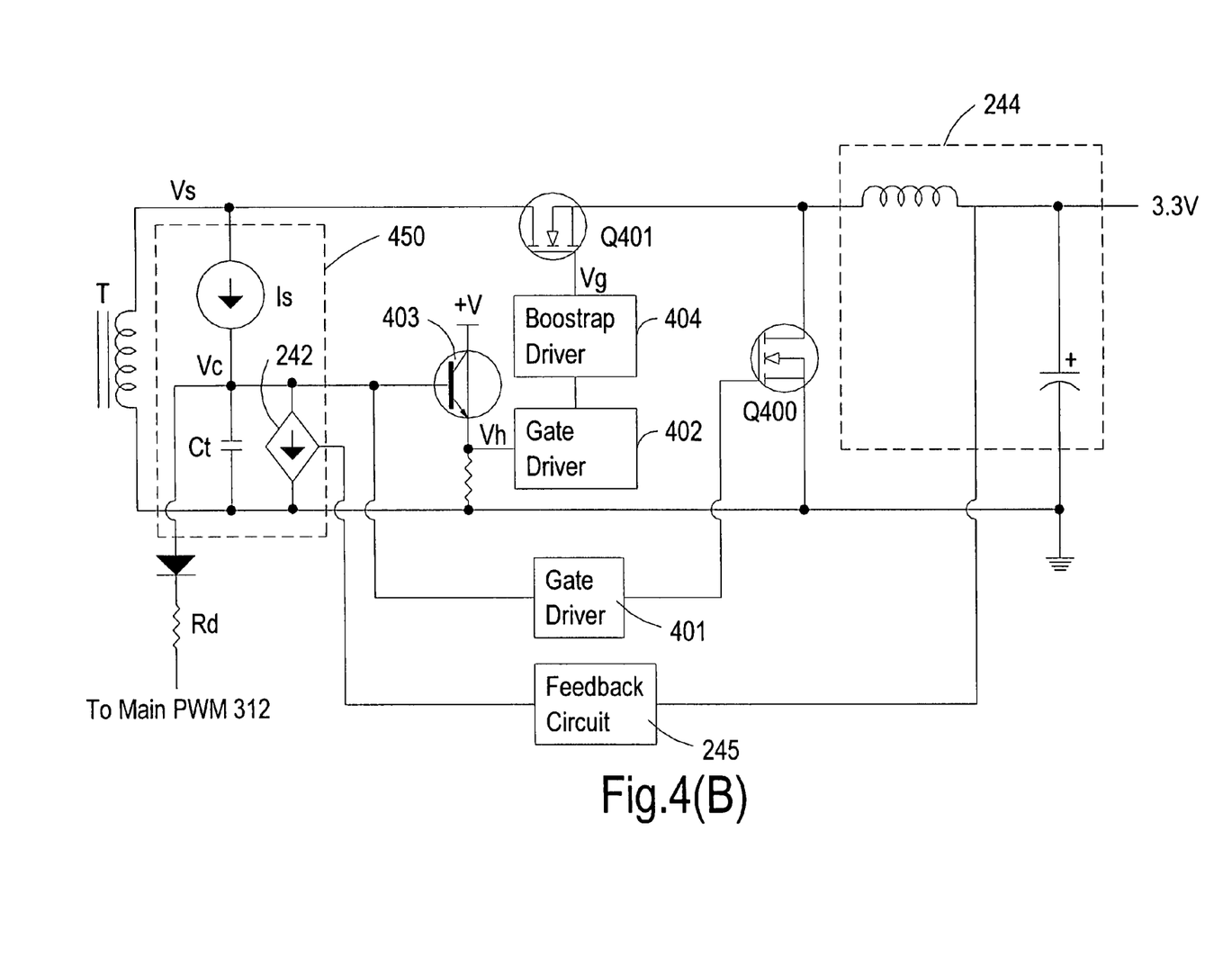
FIG. 4(B) shows a typical circuit configuration of a post voltage regulator according to a second embodiment of the present invention.

FIG. 4(B) shows a typical circuit representation of a post voltage regulator according to a second embodiment of the present invention. Likewise, similar circuit components depicted in the circuit diagrams of FIG. 2(B) and FIG. 4(B) are represented with the same reference numerals, and the explanation for their function and principle are omitted herein for simplicity. Compared to the circuit of FIG. 2(B), the resistor Rt of FIG. 2(B) is replaced by a constant current source Is as shown in FIG. 4(B) that can provides a constant current to charge the capacitor Ct. In this way, the power efficiency of the post voltage regulator of FIG. 4(B) can be increased accordingly. Also, the post voltage regulator of FIG. 4 includes a first gate driver 401 coupled between the ramp signal generator 450 and a low-voltage side transistor switch Q400. The gate driver 401 is configured to receive a raw ramp voltage generated by the ramp signal generator 450 for producing control pulse signals to turn the low-voltage side transistor switch Q400 on and off in order to achieve synchronous rectification. It is noteworthy that the post voltage regulator of FIG. 4(B) further includes a voltage level shifter circuit 403 coupled between the ramp signal generator 450 and a second gate driver 402. The voltage level shifter circuit 403 is implemented by a bipolar transistor in the present embodiment, and is used to impose a small amount of phase delay on the raw ramp voltage by shifting the voltage level of raw ramp voltage to produce a phase-shifted ramp voltage. For example, assume the raw ramp voltage is designated as Vc, and the phase-shifted ramp voltage is Vh. The relationship between the voltage levels of Vc and Vh can be represented in accordance with the following equation:

$$Vh = Vc - V_{BE}$$

Where $V_{BE}$ is the base-emitter voltage of the bipolar transistor 403. Therefore, when the capacitor Ct is charging, the bipolar transistor 403 is turned on by the raw ramp voltage Vc, and the rising edge of the ramp voltage Vh supplied to the second gate driver 402 will be slightly shifted backward to cause a lag in phase with reference to the raw ramp voltage Vc due to the small voltage level of $V_{BE}$, which is rated about 0.6 volt to 1 volt. Accordingly, the raw ramp voltage Vc will differ with the shifted ramp voltage Vh in terms of phase delay, which would in turn result in a small amount of dead time (time lag) between the control pulse signals supplied to the transistor switches Q400 and Q401. Besides, a bootstrap driver 404 is coupled between the second gate driver 402 and the high-voltage side transistor switch Q401 for boosting the voltage level of the control pulse signals provided by the second gate driver 402 to the high-voltage side transistor switch Q401, so that the high-voltage side transistor switch Q401 can be activated quickly to block the transfer of current from the secondary winding 3022 to the output filter 244 of the post voltage regulator.

Consequently, a small amount of dead time is created between the control pulse signals supplied to the transistor switches Q400 and Q401, and thus the dead time duration of the post voltage regulator can be reduced to be within a small range. In this manner, the overall power efficiency of the switching DC-DC converter is increased significantly.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A multi-output DC-DC converter comprising:

a power inverter including a switch circuit for transferring energy received from an input DC voltage and a main pulse width modulator coupled to the switch circuit for generating control pulse signals to drive the switch circuit;

a power transformer having a primary winding and a secondary winding, wherein the primary winding is coupled to the power inverter for receiving the energy therefrom and transferring the energy across the secondary winding according to the open and close of the switch circuit;

a rectifier transistor circuit coupled to the secondary winding for rectifying the energy transferred from the secondary winding into a rectified DC voltage and comprising a first rectifier transistor and a second rectifier transistor;

an output filter coupled to the rectifier transistor circuit for smoothing the rectified DC voltage to generate a regulated DC voltage;

a plurality of post voltage regulators tapped to the secondary winding for providing a plurality of regulated DC voltages;

a pair of series capacitor coupled across the secondary winding and the first rectifier transistor for providing control pulse signals to drive the first rectifier transistor; and an inverter connecting the second rectifier transistor and the main pulse width modulator of the power inverter to drive the second rectifier transistor by inverse version of the control pulse signals of the main pulse width modulator.

2. The multi-output DC-DC converter according to claim 1 wherein a gate terminal of the second rectifier transistor is connected to the main pulse width modulator via the inverter.

3. The multi-output DC-DC converter according to claim 2 wherein the post voltage regulator comprises:
   a current blocking device coupled to the secondary winding for blocking the transfer of a current from the secondary winding;
   a synchronous rectifier coupled to the current blocking device for rectifying an AC voltage induced across the secondary winding into a rectified DC voltage;
   an output filter coupled to the current blocking device and the synchronous rectifier for smoothing the rectified DC voltage and generating a regulated DC voltage;
   a feedback circuit coupled to an output end of the output filter for comparing the regulated DC voltage with a reference voltage and generating a feedback signal accordingly; and
   a blocking controller coupled to the feedback circuit and the main pulse width modulator for generating control pulse signals in accordance with the feedback signal to drive the current blocking device and the synchronous rectifier.

4. The multi-output DC-DC converter according to claim 2 wherein the post voltage regulator comprises:
   a first transistor switch for rectifying an AC voltage induced across the secondary winding;
   a second transistor switch for blocking the transfer of a current from the secondary winding;
   a ramp signal generator coupled to the secondary winding for generating a raw ramp voltage;
   a first gate driver coupled between the ramp signal generator and the first transistor switch for receiving the raw ramp voltage and generating control pulse signals in accordance with the raw ramp voltage to drive the first transistor switch;
   a voltage level shifter circuit coupled to the ramp signal generator for subtracting a voltage level from the raw ramp voltage to generate a phase-shifted ramp voltage; and
   a second gate driver coupled between the voltage level shifter circuit and the second transistor switch for receiving the phase-shifted ramp voltage and generating control pulse signals in accordance with the phase-shifted ramp voltage to drive the second transistor switch.

5. The multi-output DC-DC converter according to claim 4 wherein the ramp signal generator comprises:
   a constant current source coupled to the secondary winding for providing a constant current;
   a capacitor coupled to the constant current source for being charged by the constant current and generating the raw ramp voltage; and
   a voltage-controlled current source coupled across the capacitor for changing a charging rate of the capacitor.

6. The multi-output DC-DC converter according to claim 4 wherein the post voltage regulator further comprises a bootstrap driver coupled between the second transistor switch and the second gate driver for boosting a voltage level of control pulse signals provided by second gate driver to the second transistor switch.

7. The multi-output DC-DC converter according to claim 1 wherein a gate terminal of the first rectifier transistor is coupled to a center terminal of the pair of series capacitors.

* * * * *